United States Patent
Wu

(10) Patent No.: US 12,493,618 B2
(45) Date of Patent: Dec. 9, 2025

(54) METHOD, APPARATUS AND ELECTRONIC DEVICE FOR DATA QUERYING

(71) Applicant: Beijing Zitiao Network Technology Co., Ltd., Beijing (CN)

(72) Inventor: Yanchun Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/630,512

(22) Filed: Apr. 9, 2024

(65) Prior Publication Data
US 2024/0346025 A1    Oct. 17, 2024

(30) Foreign Application Priority Data
Apr. 13, 2023    (CN) .......................... 202310395792.6

(51) Int. Cl.
*G06F 16/00* (2019.01)
*G06F 16/2455* (2019.01)

(52) U.S. Cl.
CPC .............................. *G06F 16/24561* (2019.01)

(58) Field of Classification Search
CPC ................................................ G06F 16/24561
See application file for complete search history.

(56) References Cited

U.S. PATENT DOCUMENTS

| | | | | |
|---|---|---|---|---|
| 2005/0038630 A1* | 2/2005 | Verschell | ............ | G06F 16/2453 702/182 |
| 2009/0187815 A1* | 7/2009 | Becerra, Sr. | .......... | G06F 16/283 715/212 |
| 2009/0210430 A1 | 8/2009 | Averbuch et al. | | |
| 2013/0097563 A1* | 4/2013 | Pacheco Rodrigues Velho | .......... | G06F 3/0488 715/850 |
| 2014/0019842 A1* | 1/2014 | Montagna | ............... | G06F 40/18 715/227 |
| 2016/0132481 A1* | 5/2016 | Dickerman | ............. | G06F 40/18 715/219 |

FOREIGN PATENT DOCUMENTS

| | | |
|---|---|---|
| CN | 111177206 A | 5/2020 |
| CN | 112883023 A | 6/2021 |
| CN | 113297300 A | 8/2021 |

OTHER PUBLICATIONS

Chinese Patent Application No. 202310395792.6; Office Action dated Jul. 4, 2025, 19 pages with machine translation.

* cited by examiner

*Primary Examiner* — Syed H Hasan
(74) *Attorney, Agent, or Firm* — BakerHostetler

(57) ABSTRACT

Embodiments of the disclosure disclose a method, apparatus and electronic device for data querying. The method includes: traversing data records of a target data source; for each target data record, obtaining, based on an aggregation basis dimension of the target data source, a target aggregation basis path corresponding to the target data record, and updating, based on dimension types and dimension values of the target data record in aggregate computation dimensions, summarized values, corresponding to a plurality of summary types, of the target aggregation basis path in the aggregate computation dimensions in a data pivot table of the target data source; and after the data records of the target data source are traversed, performing a data pivot service of the target data source based on the data pivot table.

19 Claims, 4 Drawing Sheets

METHOD, APPARATUS AND ELECTRONIC DEVICE FOR DATA QUERYING

CROSS REFERENCE

The present application claims priority to Chinese Patent Application No. 202310395792.6, filed on Apr. 13, 2023, and entitled "Method, apparatus and electronic device for data querying", the entirety of which is incorporated herein by reference.

FIELD

The present disclosure relates to the field of data processing, and in particular, to a method, apparatus and electronic device for data querying.

BACKGROUND

In the field of online documents, data plays a crucial role, and tables have the capability to store, analyze, and visualize data. A pivot table is an important tool in table-based data analysis. A data pivot table is a tool for quickly combining and analyzing data sources. Through the pivot table, it is easy to construct a desired data aggregation view, and a large amount of data information in the data sources can be aggregated in rows and columns to show a relationship and a distribution between data through operations such as summing, averaging, and the like.

The data aggregation view expected to be constructed by the data pivot table relies on a pivot aggregation engine (QueryCube). The data pivot table leads to excessive performance and memory losses. In existing data source analysis, when a summary manner is adjusted, a query operation is usually needed to be re-performed on the pivot aggregation engine, resulting in poor query efficiency.

SUMMARY

Embodiments of the present disclosure provide a method for data querying that can perform instant display according to a switched summary manner during a data pivot process without waiting for a pivot aggregation engine to re-perform a query operation, so that efficiency of pivot query is greatly improved.

Embodiments of the present disclosure further provide an apparatus, electronic device and computer-readable storage medium for data querying.

Embodiments of the present disclosure adopt the following technical solutions.

In a first aspect, there is provided a method for data querying, comprising:
traversing data records of a target data source;
for each target data record, obtaining, based on an aggregation basis dimension of the target data source, a target aggregation basis path corresponding to the target data record, and updating, based on dimension types and dimension values of the target data record in aggregate computation dimensions, summarized values, corresponding to a plurality of summary types, of the target aggregation basis path in the aggregate computation dimensions in a data pivot table of the target data source; and
after the data records of the target data source are traversed, performing a data pivot service of the target data source based on the data pivot table.

In a second aspect, there is provided an apparatus for data querying, comprising:
a traversal search module, configured to traverse data records of a target data source;
a writing for updating module, configured to: for each target data record, obtain, based on an aggregation basis dimension of the target data source, a target aggregation basis path corresponding to the target data record, and writing for updating, based on dimension types and dimension values of the target data record in aggregate computation dimensions, summarized values, corresponding to a plurality of summary types, of the target aggregation basis path in the aggregate computation dimensions into a data pivot table of the target data source; and
a data pivot service module, configured to: after the data records of the target data source are traversed, perform a data pivot service of the target data source based on the data pivot table.

In a third aspect, there is provided an electronic device, comprising:
a processor; and
a memory for storing computer-executable instructions which, when executed, cause the processor to perform the following operations:
traversing data records of a target data source;
for each target data record, obtaining, based on an aggregation basis dimension of the target data source, a target aggregation basis path corresponding to the target data record, and updating, based on dimension types and dimension values of the target data record in aggregate computation dimensions, summarized values, corresponding to a plurality of summary types, of the target aggregation basis path in the aggregate computation dimensions in a data pivot table of the target data source; and
after the data records of the target data source are traversed, performing a data pivot service of the target data source based on the data pivot table.

In a fourth aspect, there is provided a computer-readable storage medium. The computer-readable storage medium stores computer-executable instructions which, when executed by a processor, cause the processor to implement the following operations:
traversing data records of a target data source;
for each target data record, obtaining, based on an aggregation basis dimension of the target data source, a target aggregation basis path corresponding to the target data record, and updating, based on dimension types and dimension values of the target data record in aggregate computation dimensions, summarized values, corresponding to a plurality of summary types, of the target aggregation basis path in the aggregate computation dimensions in a data pivot table of the target data source; and
after the data records of the target data source are traversed, performing a data pivot service of the target data source based on the data pivot table.

At least one of the foregoing technical solutions used in the embodiments of the present disclosure can achieve the following beneficial effects:

By using values of each data record in a target data source in aggregation basis dimensions as an aggregation path, for respective aggregate computation dimensions on the aggregation path, summarizing operations corresponding to a plurality of summary types are performed respectively and resulted summarized values are stored in a data pivot table.

Then, a data pivot service is performed according to the data pivot table, so that aggregated data in one data pivot table can be used in common for the plurality of summary types. This enables a user to perform instant display according to a switched summary manner during a data pivot process without waiting for a pivot aggregation engine to re-perform a query operation, so that efficiency of pivot query is greatly improved.

BRIEF DESCRIPTION OF THE SEVERAL VIEWS OF THE DRAWINGS

The accompanying drawings described herein, which constitute a part of the present disclosure, provide a further understanding of the present disclosure. The schematic embodiments of the present disclosure and descriptions thereof are intended to explain the present disclosure, and do not constitute inappropriate limitation on the present disclosure. In the accompanying drawings.

DETAILED DESCRIPTION

In order to make the purpose, technical solutions and advantages of the present disclosure clearer, the technical solutions of the present disclosure will be clearly and completely described below in conjunction with specific embodiments of the present disclosure and corresponding drawings. Obviously, the described embodiments are only some of the embodiments of the present disclosure, not all of them. Based on the embodiments in this disclosure, all other embodiments obtained by those of ordinary skill in the art without creative efforts fall within the scope of protection of this disclosure. In order to facilitate understanding of the technical solutions of embodiments of the present disclosure, the following concepts are introduced.

Pivot table: A pivot table is an interactive table that can perform some computations, such as summing, and counting. The computations performed are related to data and data pivot.

Pivot aggregation engine (Query Cube): A pivot aggregation engine describes a data structure for query aggregation of a pivot table.

Dimension (Field): A dimension is a measure, which can be simply understood as a column in a data source (data table).

Item (item): An item is a field value that may appear in a certain dimension, for example, "Shenzhen" and "Beijing" in the "city" dimension are called items.

The technical solutions provided in the embodiments of the present disclosure are described in detail below with reference to the accompanying drawings.

Figure 1:
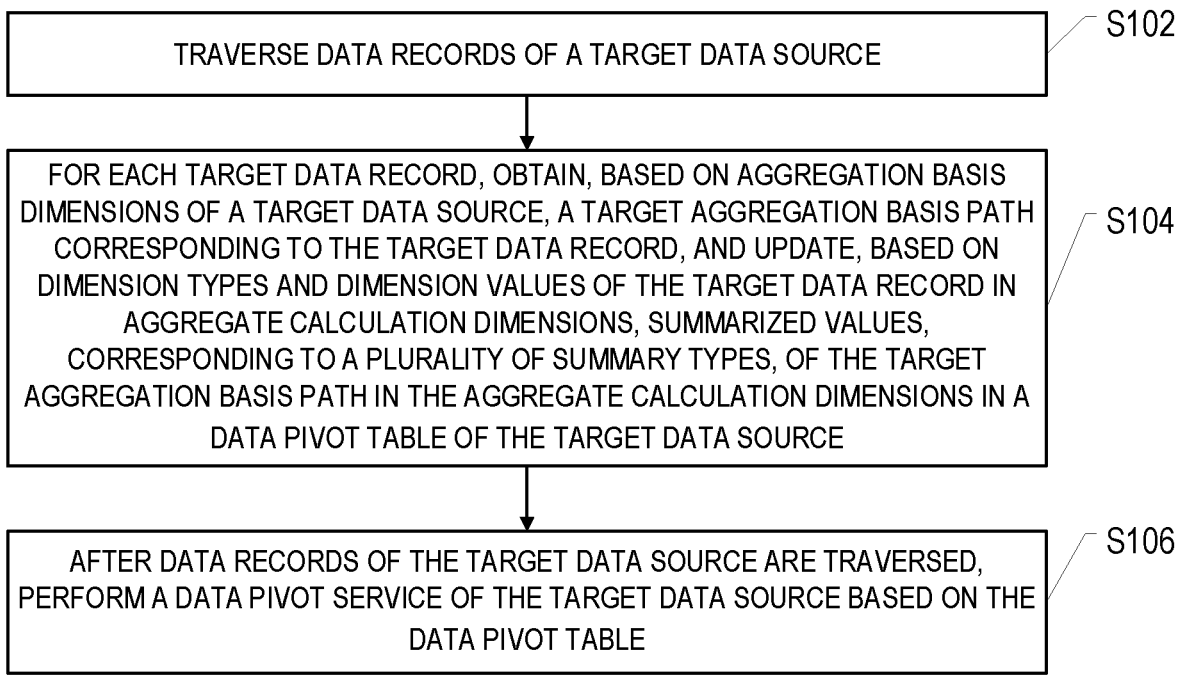
FIG. 1 is a flowchart of a method for data querying according to an embodiment of the present disclosure.

FIG. 1 is a flowchart of a method for data querying according to an embodiment of the present disclosure. It should be understood that the method for data querying in this embodiment of the present disclosure can be applied to near-end or far-end voice processing. The method may include the following steps:

At S102, traversing data records of a target data source.

It should be understood that in this embodiment of the present disclosure, the target data source generally refers to a data table, or another data model that describes a data table. For example, a pivot cache can be used as a data model of the target data source, and the pivot cache is traversed to process each data record. Every index of each data record is a row index.

In order to facilitate understanding of the technical solution of the embodiment of the present disclosure, the following uses automobile sales price data in Table 1 as an example for illustration. It should be understood that other steps related to the target data source in this embodiment of the present disclosure are illustrated by taking the data in Table 1 as an example.

TABLE 1

| Date of sale | Province of sale | City of sale | Color | Manufacturer | Selling price |
|---|---|---|---|---|---|
| Mar. 13, 2012 | Sichuan | Panzhihua | Black | Mazda | 1 |
| May 19, 2012 | Yunnan | Kunming | Black | Mazda | 10.2 |
| Dec. 21, 2020 | Gansu | Lanzhou | Black | Mazda | 3 |
| Dec. 17, 2020 | Henan | Sanmenxia | Yellow | Mazda | 0.5 |
| Oct. 12, 2012 | Yunnan | Kunming | Black | Great Wall Motor | 84 |
| Sep. 1, 2020 | Henan | Sanmenxia | Black | Mazda | 80 |
| May 19, 2012 | Sichuan | Leshan | Yellow | Hongqi | 22 |
| Dec. 21, 2020 | Guangdong | Guangzhou | White | Buick | 22 |
| Dec. 17, 2020 | Hebei | Zaozhuang | White | BMW | 76 |
| Aug. 28, 2012 | Henan | Sanmenxia | White | Mazda | 82 |
| Nov. 7, 2020 | Henan | Zhengzhou | Silver | BYD | 73 |
| Oct. 29, 2020 | Heilongjiang | Mudanjiang | Black | Infiniti | 78 |
| Oct. 30, 2012 | Guangdong | Jiangmen | Black | Buick | 25 |
| Nov. 3, 2012 | Hebei | Zaozhuang | Black | Buick | 86 |
| Sep. 24, 2020 | Heilongjiang | Qiqihar | Black | Great Wall Motor | 49 |
| Sep. 15, 2012 | Heilongjiang | Qiqihar | Sky blue | Buick | 30 |
| Oct. 1, 2020 | Guangdong | Shenzhen | Silver | BMW | 71 |
| Jun. 27, 2012 | Hebei | Qinhuangdao | Dark blue | BYD | 70 |
| May 24, 2012 | Guangdong | Zhanjiang | Black | BMW | 27 |

At S104, for each target data record, obtaining, based on an aggregation basis dimension of the target data source, a target aggregation basis path corresponding to the target data record, and updating, based on dimension types and dimension values of the target data record in aggregate computation dimensions, summarized values, corresponding to a plurality of summary types, of the target aggregation basis path in the aggregate computation dimensions in a data pivot table of the target data source.

It should be understood that after one target data record is taken out, a col index (column index) in the data source needs to be obtained from the pivot cache according to a dimension. Based on a row index and a col index, a cell can be determined in the two-dimensional data source.

It should be understood that in this embodiment of the present disclosure, the dimensions of the target data source may include an aggregation basis dimension and an aggregate computation dimension.

The aggregation basis dimension is a grouping basis for grouping and summarizing the target data source. For example, in the data shown in Table 1, dimensions such as province of sale, city of sale, color, and manufacturer can all be used as the basis for grouping, that is, the aggregation basis dimension. Certainly, it should be understood that the aggregation basis dimensions may be pre-configured or determined based on a dimension selected by a user. For example, in this embodiment of the present disclosure, three dimensions of province of sale, city of sale, and manufacturer can be selected as the aggregation basis dimensions. Because the aggregation basis dimension can be pre-configured or selected by the user, flexibility of generating a data pivot table is greatly improved.

The aggregate computation dimension, as the name suggests, is a dimension for aggregation computation. Any dimension other than the aggregation basis dimension can be used as the aggregate computation dimension. For example, in Table 1, after selecting the three dimensions of province of sale, city of sale, and manufacturer as the aggregation basis dimensions, there are three remaining dimensions of date of sale, color, and selling price. These three dimensions can all be used as aggregate computation dimensions. Generally speaking, an aggregate computation dimension selected is a dimension with a dimension type of numeral. Certainly, a non-numeric dimension may alternatively be selected as the aggregate computation dimension, but non-numeric dimension only supports some summary types, such as summary of counts.

Certainly, the dimension of the target data source may be neither the aggregation basis dimension nor the aggregate computation dimension. For example, only selling price is selected as the aggregate computation dimension, and in this case, color and date of sale are neither the aggregation basis dimension nor the aggregate computation dimension.

It should be understood that after the aggregation basis dimensions are traversed for each target data record, an aggregation basis path corresponding to the data can be obtained, and the path serves as a keyword (key) of an aggregation unit.

Specifically, for each target data record, the obtaining, based on an aggregation basis dimension of the target data source, a target aggregation basis path corresponding to the target data record includes: obtaining dimension values of the target data record in respective aggregation basis dimensions in the target data source; and combining the dimension values of the target data record in the respective aggregation basis dimensions in the target data source according to a preset arrangement order of the respective aggregation basis dimensions of the target data source, to obtain the target aggregation basis path corresponding to the target data record.

It should be understood that the arrangement order in which the aggregation basis dimensions form the path is configurable or fixed according to a certain rule, for example, arrangement is performed in an order of column indexes. Taking Table 1 as an example, a plurality of paths such as "Sichuan-Panzhihua-Mazda", "Yunnan-Kunming-Mazda", "Gansu-Lanzhou-Great Wall Motor", and the like can be generated.

After the path is obtained, the updating, based on dimension types and dimension values of the target data record in aggregate computation dimensions, summarized values, corresponding to a plurality of summary types, of the target aggregation basis path in the aggregate computation dimensions in a data pivot table of the target data source specifically includes: if data corresponding to the target aggregation basis path does not exist in the data pivot table, writing, based on a corresponding dimension value of the target data record in a target aggregate computation dimension and a dimension type of the target aggregate computation dimension, into the data pivot table of the target data source, summarized values corresponding to a plurality of summary types corresponding to the target aggregation basis path and the target aggregate computation dimension; or if data corresponding to the target aggregation basis path exists in the data pivot table, obtaining current summarized values, corresponding to the plurality of summary types, of the target aggregation basis path in the aggregate computation dimensions in the data pivot table of the target data source; and updating, based on current summarized values corresponding to a plurality of summary types corresponding to the target aggregation basis path and the target aggregate computation dimension in the data pivot table of the target data source, and a corresponding dimension value of the target data record in a target aggregate computation dimension and a dimension type of the target aggregate computation dimension, summarized values, in the data pivot table of the target data source, corresponding to the plurality of summary types corresponding to the target aggregation basis path and the target aggregate computation dimension.

In this embodiment of the present disclosure, a path is constructed based on the aggregation basis dimension, and summaries corresponding to a plurality of summary types under the path are generated respectively in respective aggregate computation dimensions, to construct a minimum aggregation result of the data pivot table. Then, a data pivot service is performed according to the data pivot table, so that aggregated data in one data pivot table can be used in common for the plurality of summary types. This enables a user to perform instant display according to a switched summary manner during a data pivot process without waiting for a pivot aggregation engine to re-perform a query operation, so that efficiency of pivot query is greatly improved.

In addition, because the plurality of summary types share one data pivot table, memory overheads can be reduced.

Certainly, it should be understood that an aggregation path cache pool may be further introduced in this embodiment of the present disclosure. An aggregation path cache pool is queried for a corresponding aggregation unit identifier of the target aggregation basis path, where the aggregation path cache pool stores aggregation basis paths already summarized in the target data source and corresponding aggregation unit identifiers, and aggregation units indicated by the aggregation unit identifiers include current summarized values corresponding to a plurality of summary types of the respective aggregate computation dimensions under a corresponding aggregation basis path.

Combined with the content of Table 1, Table 2 gives an example of the aggregation path cache pool.

TABLE 2

| Path | Calc Unit ID |
|---|---|
| Sichuan-Panzhihua-Mazda | 0 |
| Yunnan-Kunming-Mazda | 1 |
| Gansu-Lanzhou-Mazda | 2 |
| Henan-Sanmenxia-Mazda | 3 |
| Yunnan-Kunming-Great Wall Motor | 4 |

Each path corresponds to an identifier of one aggregation unit, and the aggregation unit may be stored in an aggregation unit table, as shown in Table 3.

TABLE 3

| Calc Unit ID | Calc Unit Item |
|---|---|
| 0 | Itemobject0 |
| 1 | Itemobject1 |
| 2 | Itemobject 2 |
| 3 | Itemobject 3 |
| 4 | Itemobject 4 |

Itemobject0 to Itemobject4 are all aggregation units. One aggregation unit includes values of respective summary types in respective aggregate computation dimensions. For example, in this embodiment of the present disclosure, there may be only one aggregate computation dimension "selling price", and the summary type may include summation (sum), counting (count), numeric counting (countNums), calculating a quadratic sum (sumx2), averaging, calculating a product (product), calculating a maximum value (max), or calculating a minimum value (min), and so on. Certainly, it should be understood that one or more aggregate computation dimensions may be included in one aggregation unit. Summary types in different aggregate computation dimensions may be the same or different.

It should be understood that for different summary types, when dimension types of the aggregate computation dimension are a numeric type and a non-numeric type, computation manners may be the same or different. Summary results of some summary types may be shown in Table 4 below:

TABLE 4

| Summary type | cellValue is a numeric type | cellValue is a non-numeric type |
|---|---|---|
| sum | Sum += cellValue | Unchanged |
| count | Count += 1 | Count += 1 |
| countNums | countNums += 1 | Unchanged |
| sumx2 | sumx2 += cellValue * cellValue | Unchanged |
| product | Product *= cellValue | Unchanged |
| max | max = Math.max(max, cellValue) | Unchanged |
| min | Min = Math.min(min, cellValue) | Unchanged |

Certainly, the several summary types shown in Table 4 above can be obtained at most based on a current summarized value and a current value of the aggregate computation dimension. However, determination of some summary types may need additional summary types. For example, during computation of an average, a current average needs to be multiplied by a current count value, a product thereof is added to a current value of the aggregate computation dimension, and then a sum thereof is divided by the current count value plus 1.

In this embodiment of the present disclosure, by iterating of aggregated data based on Welford, any summary type can achieve unlimited cumulative numbers under linear conditions.

In addition, it should be understood that the aggregation unit may be represented by a variety of data structures, for example, by an XML data structure or a JSON data structure. This is not limited in this embodiment of the present disclosure.

In this embodiment of the present disclosure, by introducing the aggregation path cache pool, it is possible to quickly retrieve data corresponding to the target aggregation basis path in the data pivot table, thereby improving efficiency of generating the data pivot table.

After step S104 is performed for all data records of the target data source, the data pivot table of the target data source is obtained. Then, pivot query can be performed based on the data pivot table. Certainly, it should be understood that if the target data source changes, a data pivot table needs to be regenerated. A data pivot table may be regenerated based on incremental data (including three types of addition, deletion, and update) of the target data source, or may be regenerated after the previous data pivot table is cleared.

At S106, after the data records of the target data source are traversed, performing a data pivot service of the target data source based on the data pivot table.

It should be understood that for specific implementation of performing the data pivot service based on the data pivot table, a data pivot method in an existing technology may be referred to.

Figure 2:
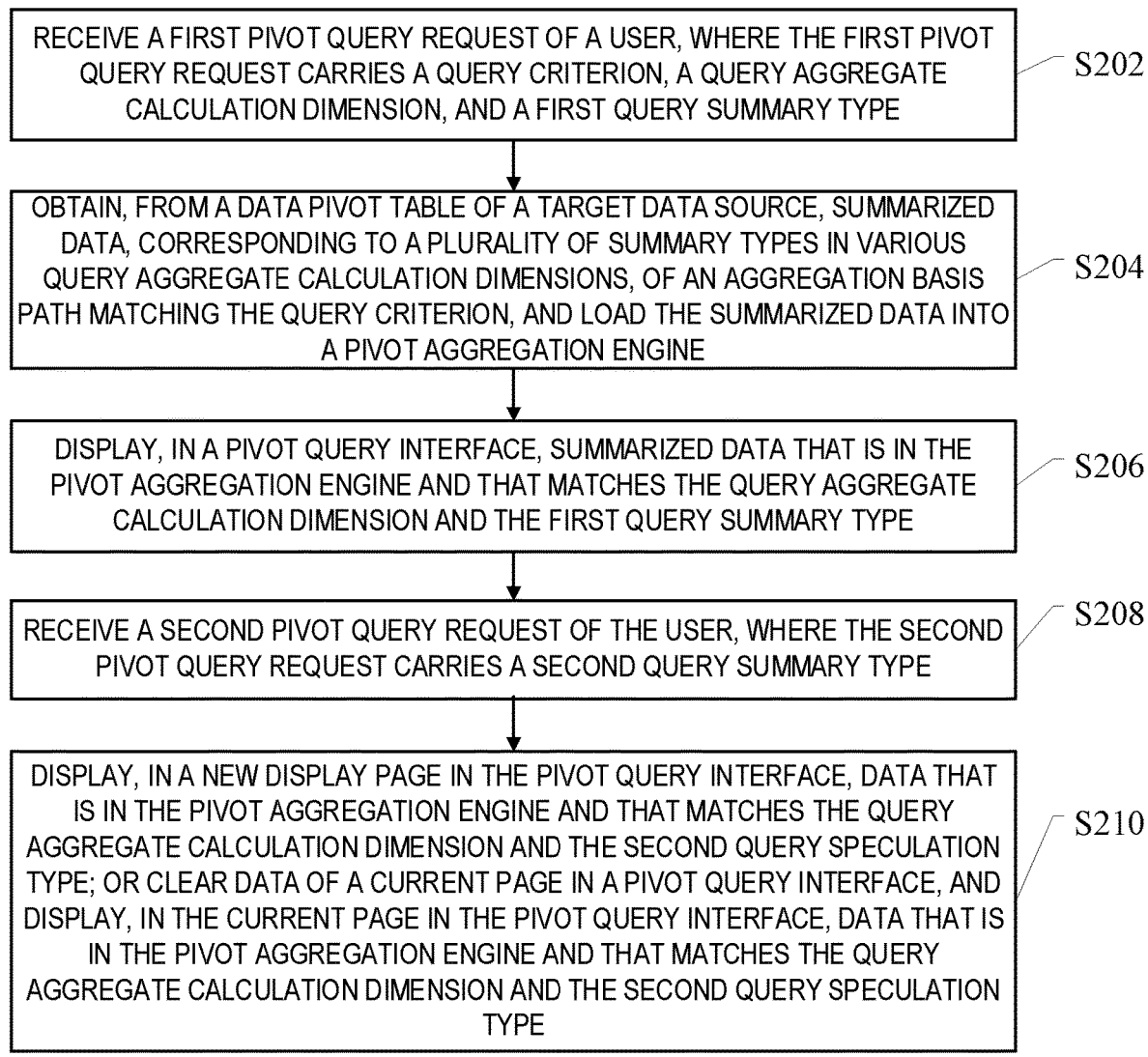
FIG. 2 is a schematic diagram of a method for data pivot querying according to an embodiment of the present disclosure.

FIG. 2 is a schematic diagram of a method for data pivot querying according to an embodiment of the present disclosure. Optionally, specific implementation of step S106 may be as shown in FIG. 2, including the following steps:

At S202, receiving a first pivot query request of a user, where the first pivot query request carries a query condition, a query aggregate computation dimension, and a first query summary type.

At S204, obtaining, from the data pivot table of the target data source, summarized data, corresponding to a plurality of summary types in respective query aggregate computation dimensions, of an aggregation basis path matching the query condition, and loading the summarized data into a pivot aggregation engine.

At S206, displaying, in a pivot query interface, summarized data that is in the pivot aggregation engine and that matches the query aggregate computation dimension and the first query summary type.

In this embodiment of the present disclosure, by using values of each data record in aggregation basis dimensions as an aggregation path, for respective aggregate computation dimensions on the aggregation path, summarizing operations corresponding to a plurality of summary types are performed respectively and resulted summarized values are stored in a data pivot table, so that in a data pivot stage, data is directly loaded from the data pivot table to the pivot aggregation engine and displayed. This enables instant display to be performed according to a switched summary manner during a data pivot process without waiting for the pivot aggregation engine to re-perform a query operation, so that efficiency of pivot query is greatly improved.

Alternatively, the aggregation basis dimension includes a row dimension and a column dimension, the row dimension corresponds to a data row displayed in the pivot query interface, and the column dimension corresponds to a data column displayed in the pivot query interface.

In this embodiment of the present disclosure, during a data pivot query, the aggregation basis dimension may be divided into a row dimension and a column dimension, so that data pivot is performed according to the row dimension and the column dimension, and the aggregate computation dimensions are displayed in corresponding cells in the row dimension and the column dimension.

Optionally, after step S206, the method may further include the following steps:

At S208, receiving a second pivot query request of the user, where the second pivot query request carries a second query summary type.

At S210, displaying, in a new display page in the pivot query interface, data that is in the pivot aggregation engine and that matches the query aggregate computation dimension and the second query speculation type; or clearing data of a current page in a pivot query interface, and displaying, in the current page in the pivot query interface, data that is in the pivot aggregation engine and that matches the query aggregate computation dimension and the second query speculation type.

In this embodiment of the present disclosure, in a data pivot query page that has been displayed, by switching a query summary type, a display page corresponding to a switched query summary type can be quickly generated based on data in the pivot aggregation engine. There is no need to wait for the pivot aggregation engine to re-perform a query operation, so that efficiency of pivot query is greatly improved.

In order to facilitate understanding of the technical solutions of the embodiments of the present disclosure, the method of the embodiments of the present disclosure will be described below with reference to FIG. 3.

Figure 3:
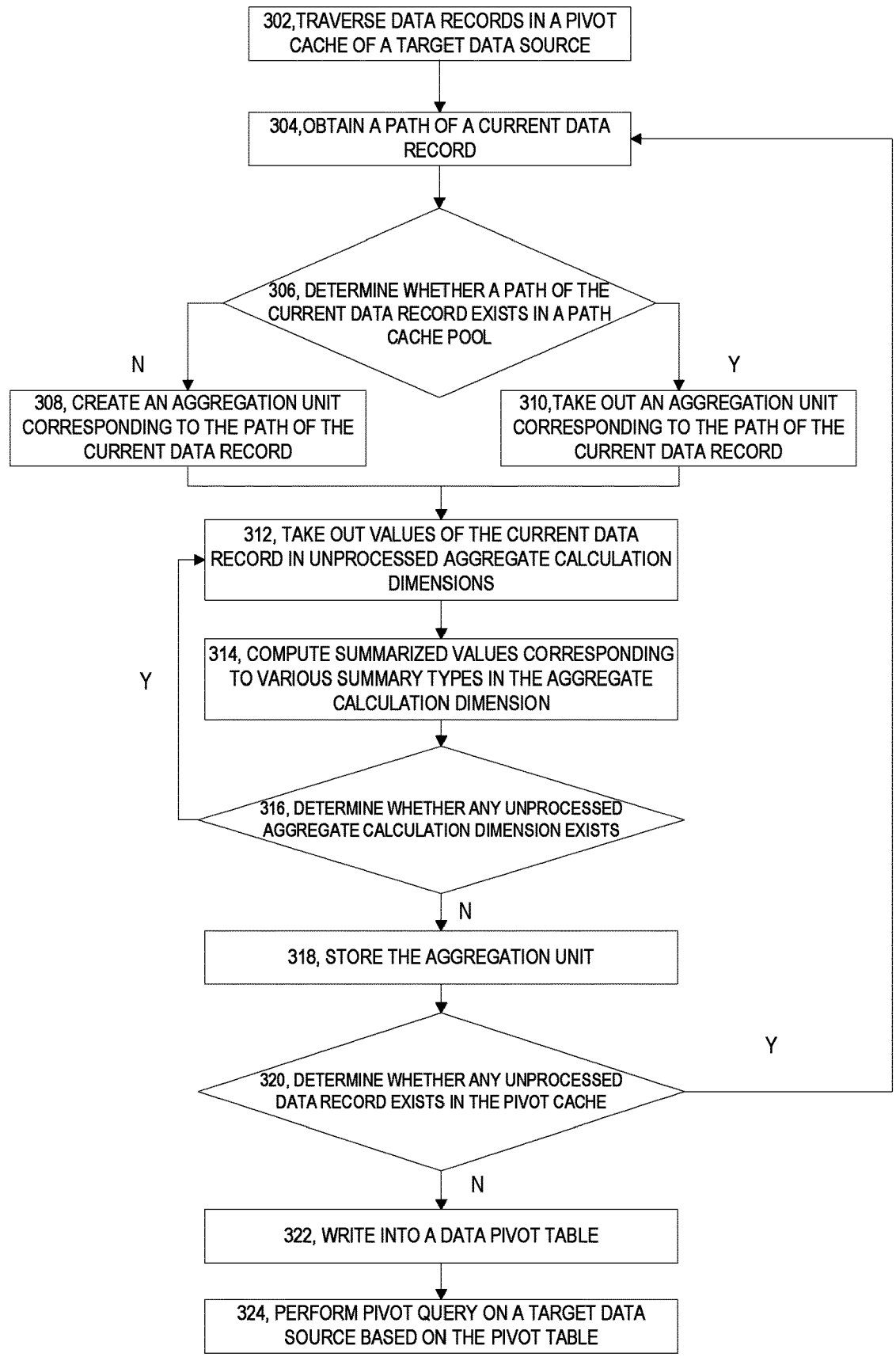
FIG. 3 is a schematic diagram of generating a data pivot table according to an embodiment of the present disclosure.

FIG. 3 is a schematic diagram of generating a data pivot table according to an embodiment of the present disclosure. As shown in FIG. 3, the following steps may be included.

At 302, traversing data records in a pivot cache.

In this embodiment of the present disclosure, the pivot cache is used as a data model of a target data source. By traversing the pivot cache, each data record of the target data source is obtained.

At 304, obtaining a path of a current data record.

In this embodiment of the present disclosure, values of each data record in aggregation basis dimensions may be obtained, and a path is generated according to a preset combination rule of the aggregation basis dimensions.

For example, in Table 1, the three dimensions of province of sale, city of sale, and manufacturer may be used as aggregation basis dimensions, and are combined into a path according to "province of sale-city of sale-manufacturer". In this case, a path of a first data record in Table 1 is "Sichuan-Panzhihua-Mazda".

At 306, determining whether a path of the current data record exists in a path cache pool.

In this embodiment of the present disclosure, a path cache pool may be established to store aggregated data corresponding to a calculated path. For example, a table such as Table 2 may be established to record the path and an identifier of a corresponding aggregation unit.

If the path of the current data record does not exist in the path cache pool, step 308 is performed; or otherwise, step 310 is performed.

At 308, creating an aggregation unit corresponding to the path of the current data record.

When the path of the current data record does not exist in the path cache pool, it means that the path is a new path, and a new aggregation unit identifier needs to be allocated to the path and recorded into the path cache pool. At the same time, an aggregation unit is created for the new aggregation unit identifier.

It should be understood that the aggregation unit in this case may be understood as a data object, and can be recorded by using a plurality of data structures, such as XML, and JSON.

Then, step 312 is performed to do a computation based on the current data record and write a calculated result into the aggregation unit.

At 310, taking out an aggregation unit corresponding to the path of the current data record.

When the path of the current data record exists in the path cache pool, an aggregation unit identifier corresponding to the path of the current data record is taken from the path cache pool, and then an aggregation unit corresponding to the aggregation unit identifier is taken out.

Then, step 312 is performed to do a computation based on the current data record and write a calculated result into the aggregation unit for updating.

At 312, taking out values of the current data record in unprocessed aggregate computation dimensions.

It should be understood that after an aggregation unit object is obtained, values of the current data record in all aggregate computation dimensions need to be taken out, and summarized values corresponding to respective summary types in the aggregate computation dimensions are computed. Specifically, the values of the current data record in the unprocessed aggregate computation dimensions may be taken out one by one.

At 314, computing summarized values corresponding to various summary types in the aggregate computation dimension.

For specific implementation of calculating the summarized values, the relevant content of Table 4 in the embodiment shown in FIG. 1 may be referred to, and details are not described herein again.

At 316, determining whether any unprocessed aggregate computation dimension exists.

After processing of one aggregate computation dimension, it is necessary to determine whether any unprocessed aggregate computation dimension exists. If so, step 312 is jumped to and performed; if not, it means that processing of the current data record is completed, and step 318 is performed.

At 318, storing the aggregation unit.

At 320, determining whether any unprocessed data record exists in the pivot cache.

After processing of one data record, it is necessary to determine whether any unprocessed data record exists. If so, step 304 is jumped to and performed; if not, it means that processing of the current data record is completed, and step 322 is performed.

At 322, writing into the data pivot table.

At 324, performing pivot query on the target data source based on the pivot table.

For specific implementation of step 324, the embodiment shown in FIG. 2 may be referred to, and this embodiment of the present disclosure does not impose a limitation. In this embodiment of the present disclosure, the path cache pool can be traversed to take out the aggregation unit, and then the aggregation unit is written into the data pivot table.

Certainly, it should be understood that, writing into the data pivot table for updating may also be performed after processing of each data record is completed, or after processing of each aggregate computation dimension of each data record is completed. This is not limited in this embodiment of the present disclosure.

It should be noted that steps of the method provided in the method flowcharts of the present disclosure may be performed by a same device, or the method may alternatively be performed by different devices. For example, step 21 and step 22 may be performed by a device 1, and step 23 may be performed by a device 2. For another example, step 21 may be performed by the device 1, and step 22 and step 23 may be performed by the device 2; and so on.

Figure 4:
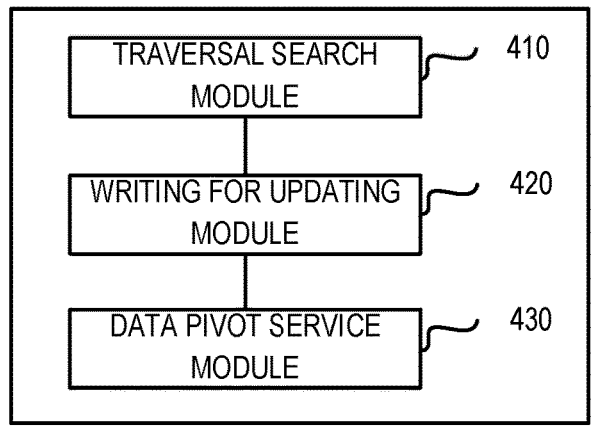
FIG. 4 is a schematic structural diagram of an apparatus for data querying according to an embodiment of the present disclosure.

FIG. 4 is a schematic structural diagram of an apparatus 400 for data querying according to an embodiment of the present disclosure. As shown in FIG. 4, the apparatus 400 includes: a traversal search module 410, configured to traverse data records of a target data source; a writing for updating module 420, configured to: for each target data record, obtain, based on an aggregation basis dimension of the target data source, a target aggregation basis path corresponding to the target data record, and writing for updating, based on dimension types and dimension values of the target data record in aggregate computation dimensions, summarized values, corresponding to a plurality of summary types, of the target aggregation basis path in the aggregate computation dimensions into a data pivot table of the target data source; and a data pivot service module 430, configured to: after the data records of the target data source are traversed, perform a data pivot service of the target data source based on the data pivot table.

In embodiments of the present disclosure, by using values of each data record in a target data source in aggregation basis dimensions as an aggregation path, for respective aggregate computation dimensions on the aggregation path, summarizing operations corresponding to a plurality of summary types are performed respectively and resulted summarized values are stored in a data pivot table. Then, a data pivot service is performed according to the data pivot table, so that aggregated data in one data pivot table can be used in common for the plurality of summary types. This enables a user to perform instant display according to a switched summary manner during a data pivot process without waiting for a pivot aggregation engine to re-perform a query operation, so that efficiency of pivot query is greatly improved.

In addition, because multiple statistical types share a pivot table, memory overhead may be reduced.

The apparatus 400 may also perform the method for data querying of the embodiments shown in FIG. 1, and implement the functions of the method for data querying in the embodiments shown in FIGS. 1 to 3. The embodiments of this disclosure will not be described in detail here.

Figure 5:
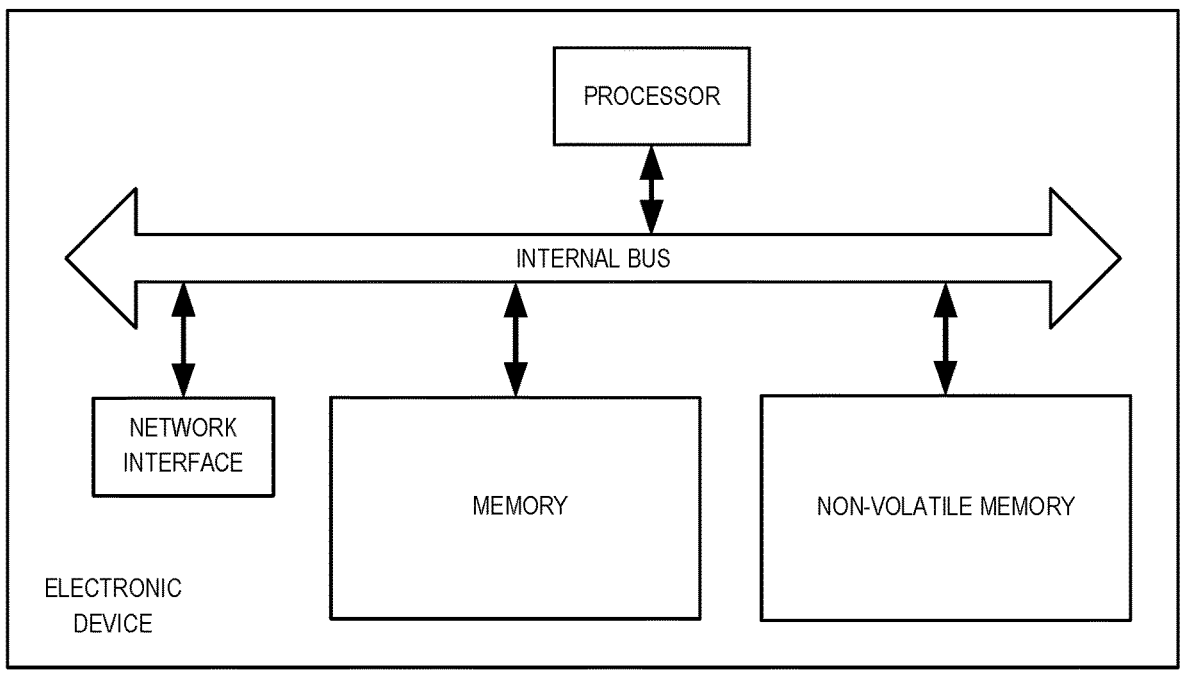
FIG. 5 is a schematic structural diagram of an electronic device according to an embodiment of the present disclosure.

FIG. 5 is a schematic structural diagram of an electronic device according to an embodiment of the present disclosure. At the hardware level, the electronic device includes a processor and optionally an internal bus, a network interface, and a storage. The storage may include a memory such as high-speed random access memory (RAM) and may also include non-volatile memory such as at least one disk memory, etc. Certainly, the electronic device may also include other hardware required by the business.

The processor, network interface, and storage can be connected to each other through an internal bus, which can be an Industry Standard Architecture (ISA) bus, a Peripheral Component Interconnect (PCI) bus, or an extended industry standard Structure (EISA) bus, etc. The bus can be divided into address bus, data bus, control bus, etc. For case of presentation, only one bidirectional arrow is used in FIG. 5, but it does not mean that there is only one bus or one type of bus.

The storage is used to store a program. Specifically, the program may include program code including computer operating instructions. The storage may include internal memory and non-volatile memory and provides instructions and data to the processor.

The processor reads the corresponding computer program from the non-volatile memory into the memory and then runs it, forming an apparatus for data querying at the logical level. The processor executes the program stored in the storage and is specifically used to perform the following operations: traversing data records of a target data source; for each target data record, obtaining, based on an aggregation basis dimension of the target data source, a target aggregation basis path corresponding to the target data record, and updating, based on dimension types and dimension values of the target data record in aggregate computation dimensions, summarized values, corresponding to a plurality of summary types, of the target aggregation basis path in the aggregate computation dimensions in a data pivot table of the target data source; and after the data records of the target data source are traversed, performing a data pivot service of the target data source based on the data pivot table.

In the electronic device provided by embodiments of the present disclosure, by using values of each data record in a target data source in aggregation basis dimensions as an aggregation path, for respective aggregate computation dimensions on the aggregation path, summarizing operations corresponding to a plurality of summary types are performed respectively and resulted summarized values are stored in a data pivot table. Then, a data pivot service is performed according to the data pivot table, so that aggregated data in one data pivot table can be used in common for the plurality of summary types. This enables a user to perform instant display according to a switched summary manner during a data pivot process without waiting for a pivot aggregation engine to re-perform a query operation, so that efficiency of pivot query is greatly improved.

In addition, because the plurality of summary types share one data pivot table, memory overheads can be reduced.

The method performed by the apparatus for data querying disclosed in the embodiments shown in FIG. 1 of this disclosure can be applied to a processor or implemented by the processor. The processor may be an integrated circuit chip that has signal processing capabilities. During the implementation process, each step of the above method can be completed by instructions in the form of hardware integrated logic circuits or software in the processor. The above-mentioned processor can be a general-purpose processor, including a central processing unit (CPU), a network processor (NP), etc.; it can also be a digital signal processor (DSP), application specific integrated circuit (ASIC), Field-Programmable Gate Array (FPGA) or other programmable logic devices, discrete gate or transistor logic devices, and discrete hardware components. The disclosed methods, steps and logical block diagrams in the embodiments of this disclosure can be implemented or executed. A general-purpose processor may be a microprocessor or the processor may be any conventional processor, etc. The steps of the method disclosed in combination with the embodiments of the present disclosure can be directly implemented by a hardware decoding processor, or can be executed by a combination of hardware and software modules in the decoding processor. The software module can be located in random access memory, flash memory, read-only memory, programmable read-only memory or electrically erasable programmable memory, registers and other mature storage media in this field. The storage medium is located in the memory, and the processor reads the information in the memory and completes the steps of the above method in combination with its hardware.

The electronic device can also perform the method in FIG. 1 and implement the functions of the apparatus for data querying in the embodiments shown in FIG. 1. The embodiments of the present disclosure will not be described in detail here.

Embodiments of the present disclosure also provide a computer-readable storage medium that stores one or more programs, and the one or more programs include instructions that when executed by a portable electronic device including multiple application programs, cause the electronic device to perform the method of embodiments shown in FIG. 1, and is specifically used to perform the following operations: traversing data records of a target data source; for each target data record, obtaining, based on an aggregation basis dimension of the target data source, a target aggregation basis path corresponding to the target data record, and updating, based on dimension types and dimension values of the target data record in aggregate computation dimensions, summarized values, corresponding to a plurality of summary types, of the target aggregation basis path in the aggregate computation dimensions in a data pivot table of the target data source; and after the data records of the target data source are traversed, performing a data pivot service of the target data source based on the data pivot table.

Certainly, in addition to software implementation, the electronic device of the present disclosure does not exclude other implementation methods, such as logic devices or a combination of software and hardware, etc. That is to say, the execution body of the following processing flow is not limited to each logical unit. It can also be hardware or logic devices.

Specific embodiments of the present disclosure are described above. Other embodiments are within the scope of the appended claims. In some cases, the actions or steps documented in claims can be performed in a different order than in the embodiments and still achieve the desired results. Additionally, the processes depicted in the drawings do not necessarily require the specific order shown, or sequential order, to achieve desirable results. Multitasking and parallel processing are also possible or may be advantageous in certain implementations.

In short, the above descriptions are only preferred embodiments of the present disclosure and are not intended to limit the scope of the present disclosure. Any modifications, equivalent substitutions, improvements, etc. made within the spirit and principles of this disclosure shall be included in the protection scope of this disclosure.

The systems, devices, modules or units described in the above embodiments can be implemented by computer chips or entities, or by products with certain functions. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or A combination of any of these devices.

Computer-readable medium includes both persistent and non-persistent, removable and non-removable medium that can be implemented by any method or technology for storage of information. Information may be computer-readable instructions, data structures, modules of programs, or other data. Examples of computer storage media include, but are not limited to, phase change memory (PRAM), static random access memory (SRAM), dynamic random access memory (DRAM), other types of random access memory (RAM), and read-only memory. (ROM), electrically erasable programmable read-only memory (EEPROM), flash memory or other memory technology, compact disc read-only memory (CD-ROM), digital versatile disc (DVD) or other optical storage, Magnetic tape cassettes, tape disk storage or other magnetic storage devices or any other non-transmission medium can be used to store information that can be accessed by a computing device. As defined in this article, computer-readable media does not include transitory media, such as modulated data signals and carrier waves.

It should also be noted that the terms "comprise," "contain," or any other variation thereof are intended to cover a non-exclusive inclusion, such that a process, method, article, or apparatus that includes a list of elements not only includes those elements, but also includes Other elements are not expressly listed or are inherent to the process, method, article or equipment. Without further limitation, an element defined by the statement "comprises a . . . " does not exclude the presence of additional identical elements in a process, method, article, or device that includes the stated element.

Each embodiment in this disclosure is described in a progressive manner. The same and similar parts between each embodiment can be referred to each other. Each embodiment focuses on its differences from other embodiments. In particular, for system embodiments, since they are basically similar to method embodiments, the description is relatively simple. For relevant information, please refer to the partial description of method embodiments.

What is claimed is:

1. A method for improving query efficiency and reducing memory overheads by sharing a data pivot table, comprising:
   traversing a pivot cache to process data records of a target data source, wherein the target data source comprises aggregation basis dimensions that serve as bases for grouping and summarizing the target data source;
   generating a plurality of aggregation paths based on dimension values of the data records in the aggregation basis dimensions;
   computing a plurality of summarized values corresponding to a plurality of summarization types associated with each of the plurality of aggregation paths based on values of the data records in at least one aggregate computation dimension, wherein the at least one aggregate computation dimension is a dimension of the target data source different from the aggregation basis dimensions;
   generating the data pivot table based on the plurality of summarized values corresponding to the plurality of summarization types associated with each of the plurality of aggregation paths;
   receiving different queries associated with different summarization types, wherein the different summarization types are among the plurality of summarization types; and
   implementing the different queries by utilizing the data pivot table to improve the query efficiency.

2. The method of claim 1, further comprising:
receiving a first pivot query request of a user, wherein the first pivot query request carries a query condition, a query aggregate computation dimension, and a first query summarization type;
obtaining, from the data pivot table of the target data source, summarized data, corresponding to the plurality of summarization types in respective query aggregate computation dimensions, of an aggregation basis path matching the query condition, and loading the summarized data into a pivot aggregation engine; and
displaying, in a pivot query interface, summarized data that is in the pivot aggregation engine and that matches the query aggregate computation dimension and the first query summarization type.

3. The method of claim 1, further comprising:
receiving a second pivot query request of a user, wherein the second pivot query request carries a second query summarization type; and
displaying, in a new display page in a pivot query interface, data that is in the pivot aggregation engine and that matches the query aggregate computation dimension and the second query summarization type; or
clearing data of a current page in a pivot query interface, and displaying, in the current page in the pivot query interface, data that is in the pivot aggregation engine and that matches the query aggregate computation dimension and the second query speculation type.

4. The method of claim 1, wherein
each aggregation basis dimension of the target data source is pre-configured; or
each aggregation basis dimension of the target data source is determined based on a dimension selected by a user.

5. The method of claim 1, wherein the generating a plurality of aggregation paths based on dimension values of the data records in the aggregation basis dimensions comprises:
obtaining dimension values of a target data record in respective aggregation basis dimensions in the target data source; and
combining the dimension values of the target data record in the respective aggregation basis dimensions in the target data source according to a preset arrangement order of the respective aggregation basis dimensions of the target data source, to generate a target aggregation basis path corresponding to the target data record.

6. The method of claim 5, further comprising:
in response to determining that data corresponding to the target aggregation basis path does not exist in the data pivot table; and
writing, based on a corresponding dimension value of the target data record in a target aggregate computation dimension and a dimension type of the target aggregate computation dimension, into the data pivot table of the target data source, summarized values corresponding to the plurality of summarization types corresponding to the target aggregation basis path and the target aggregate computation dimension.

7. The method of claim 5, further comprising:
in response to determining that data corresponding to the target aggregation basis path exists in the data pivot table, obtaining current summarized values, corresponding to the plurality of summarization types, of the target aggregation basis path in the aggregate computation dimensions in the data pivot table of the target data source; and updating in the data pivot table of the target data source, based on current summarized values corresponding to the plurality of summarization types corresponding to the target aggregation basis path and the target aggregate computation dimension in the data pivot table of the target data source, a corresponding dimension value of the target data record in a target aggregate computation dimension and a dimension type of the target aggregate computation dimension, summarized values corresponding to the plurality of summarization types corresponding to the target aggregation basis path and the target aggregate computation dimension.

8. The method of claim 6, further comprising:
querying an aggregation path cache pool for a corresponding aggregation unit identifier of the target aggregation basis path, wherein the aggregation path cache pool stores aggregation basis paths already summarized in the target data source and corresponding aggregation unit identifiers, and aggregation units indicated by the aggregation unit identifiers comprise current summarized values corresponding to the plurality of summarization types of the aggregate computation dimensions under a corresponding aggregation basis path.

9. The method of claim 1, wherein each aggregation basis dimension comprises a row dimension and a column dimension, the row dimension corresponds to a data row displayed in a pivot query interface, and the column dimension corresponds to a data column displayed in the pivot query interface.

10. An electronic device, comprising:
a processor; and
a memory for storing computer-executable instructions which, when executed, cause the processor to perform acts comprising:
traversing a pivot cache to process data records of a target data source, wherein the target data source comprises aggregation basis dimensions that serve as bases for grouping and summarizing the target data source;
generating a plurality of aggregation paths based on dimension values of the data records in the aggregation basis dimensions;
computing a plurality of summarized values corresponding to a plurality of summarization types associated with each of the plurality of aggregation paths based on values of the data records in at least one aggregate computation dimension, wherein the at least one aggregate computation dimension is a dimension of the target data source different from the aggregation basis dimensions;
generating the data pivot table based on the plurality of summarized values corresponding to the plurality of summarization types associated with each of the plurality of aggregation paths;
receiving different queries associated with different summarization types, wherein the different summarization types are among the plurality of summarization types; and
implementing the different queries by utilizing the data pivot table to improve the query efficiency.

11. The electronic device of claim 10, further comprising:
receiving a first pivot query request of a user, wherein the first pivot query request carries a query condition, a query aggregate computation dimension, and a first query summarization type;
obtaining, from the data pivot table of the target data source, summarized data, corresponding to the plurality of summarization types in respective query aggregate computation dimensions, of an aggregation basis path matching the query condition, and loading the summarized data into a pivot aggregation engine; and displaying, in a pivot query interface, summarized data that is in the pivot aggregation engine and that matches the query aggregate computation dimension and the first query summarization type.

12. The electronic device of claim 10, further comprising:
receiving a second pivot query request of a user, wherein the second pivot query request carries a second query summarization type; and displaying, in a new display page in a pivot query interface, data that is in the pivot aggregation engine and that matches the query aggregate computation dimension and the second query summarization type; or clearing data of a current page in a pivot query interface, and displaying, in the current page in the pivot query interface, data that is in the pivot aggregation engine and that matches the query aggregate computation dimension and the second query speculation type.

13. The electronic device of claim 10, wherein
each aggregation basis dimension of the target data source is pre-configured; or
each aggregation basis dimension of the target data source is determined based on a dimension selected by a user.

14. The electronic device of claim 10, wherein the generating a plurality of aggregation paths based on dimension values of the data records in the aggregation basis dimensions comprises:
obtaining dimension values of a target data record in respective aggregation basis dimensions in the target data source; and
combining the dimension values of the target data record in the respective aggregation basis dimensions in the target data source according to a preset arrangement order of the respective aggregation basis dimensions of the target data source, to generate a target aggregation basis path corresponding to the target data record.

15. The electronic device of claim 14, further comprising:
in response to determining that data corresponding to the target aggregation basis path does not exist in the data pivot table; and
writing, based on a corresponding dimension value of the target data record in a target aggregate computation dimension and a dimension type of the target aggregate computation dimension, into the data pivot table of the target data source, summarized values corresponding to the plurality of summarization types corresponding to the target aggregation basis path and the target aggregate computation dimension.

16. The electronic device of claim 14, further comprising:
in response to determining that data corresponding to the target aggregation basis path exists in the data pivot table, obtaining current summarized values, corresponding to the plurality of summarization types, of the target aggregation basis path in the aggregate computation dimensions in the data pivot table of the target data source; and updating in the data pivot table of the target data source, based on current summarized values corresponding to the plurality of summarization types corresponding to the target aggregation basis path and the target aggregate computation dimension in the data pivot table of the target data source, a corresponding dimension value of the target data record in a target aggregate computation dimension and a dimension type of the target aggregate computation dimension, summarized values corresponding to the plurality of summarization types corresponding to the target aggregation basis path and the target aggregate computation dimension.

17. The electronic device of claim 15, further comprising:
querying an aggregation path cache pool for a corresponding aggregation unit identifier of the target aggregation basis path, wherein the aggregation path cache pool stores aggregation basis paths already summarized in the target data source and corresponding aggregation unit identifiers, and aggregation units indicated by the aggregation unit identifiers comprise current summarized values corresponding to the plurality of summarization types of the aggregate computation dimensions under a corresponding aggregation basis path.

18. The electronic device of claim 10, wherein each aggregation basis dimension comprises a row dimension and a column dimension, the row dimension corresponds to a data row displayed in a pivot query interface, and the column dimension corresponds to a data column displayed in the pivot query interface.

19. A non-transitory computer-readable storage medium, wherein the computer-readable storage medium stores computer-executable instructions which, when executed by a processor, cause the processor to implement acts comprising:
traversing a pivot cache to process data records of a target data source, wherein the target data source comprises aggregation basis dimensions that serve as bases for grouping and summarizing the target data source;
generating a plurality of aggregation paths based on dimension values of the data records in the aggregation basis dimensions;
computing a plurality of summarized values corresponding to a plurality of summarization types associated with each of the plurality of aggregation paths based on values of the data records in at least one aggregate computation dimension, wherein the at least one aggregate computation dimension is a dimension of the target data source different from the aggregation basis dimensions;
generating the data pivot table based on the plurality of summarized values corresponding to the plurality of summarization types associated with each of the plurality of aggregation paths;
receiving different queries associated with different summarization types, wherein the different summarization types are among the plurality of summarization types; and
implementing the different queries by utilizing the data pivot table to improve the query efficiency.

* * * * *